Figure 1:
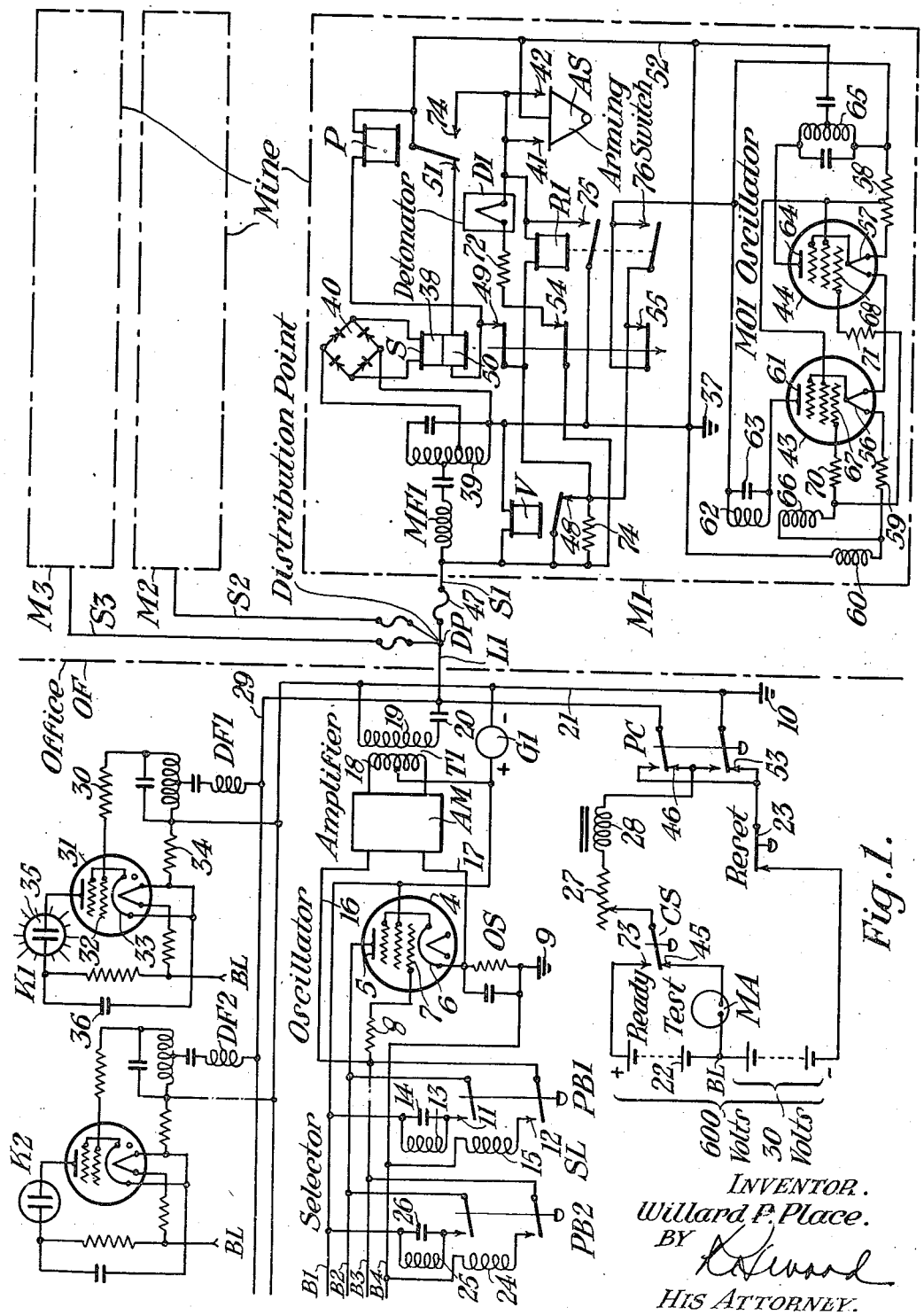

May 14, 1946.　　　　W. P. PLACE　　　　2,400,256
SELECTIVE CONTROL AND INDICATION SYSTEM
Filed May 25, 1942　　　2 Sheets-Sheet 1

INVENTOR.
Willard P. Place.
BY
HIS ATTORNEY.

Patented May 14, 1946

2,400,256

UNITED STATES PATENT OFFICE 2,400,256

SELECTIVE CONTROL AND INDICATION SYSTEM

Willard P. Place, Penn Township, Allegheny County, Pa., assignor to The Union Switch & Signal Company, Swissvale, Pa., a corporation of Pennsylvania Application May 25, 1942, Serial No. 444,460

16 Claims. (Cl. 102—11)

My invention relates to selective control and indication systems, and more particularly to systems for selectively controlling and indicating the conditions of a plurality of electrical equipments.

Selective systems are frequently required to control and operate a plurality of electrical equipments which are remote from the control point. In such systems it is desirable that the condition of each of the different equipments be indicated at the control point to aid the operator. Also it is desirable that each equipment be tested from time to time to assure that it is in an operative condition. Furthermore, it is in the interest of simplicity and economy that these several services be accomplished by the use of a single circuit extending between the control point and the different equipments.

A feature of my invention is the provision of apparatus for selective systems incorporating novel and improved means for controlling and testing from a central point or office the conditions of a plurality of remotely disposed electrical equipments and for indicating at such office the condition of each such equipment and wherewith these several services are accomplished over a single transmitting circuit between the office and the different equipments.

Another feature of my invention is the provision of apparatus of the type here involved incorporating novel means wherewith the operator can control and operate any one of a group of electrical equipments individually or control and operate the entire group simultaneously or control and operate selected ones of the group simultaneously, or control each equipment so that it is conditioned for operation by some local device at the equipment.

A peculiar feature of my invention is the provision of novel and improved apparatus for selectively controlling, operating, testing and indicating mines of a mine field.

Furthermore, a feature of my invention is the provision of improved means for controlling, testing and indicating a mine field whereby quick and flexible control of individual mines or groups of mines is provided with apparatus that is easily understood, economical in cost and highly reliable in its operation.

Other features, objects and advantages of my invention will appear as the specification progresses.

The above features, objects and advantages of my invention I attain by using alternating currents of different frequencies for selectively controlling and indicating a plurality of different electrical equipments, there being provided a distinctive preselected control frequency and a distinctive preselected indication frequency for each such equipment. I further provide two direct current sources of different voltages from which there are derived a relatively high operating voltage and a relatively low control and test voltage as well as a polarized control. Such an arrangement of currents of different characteristics permits the several services of control, test, indication and operation to be accomplished through a single two-conductor circuit.

I shall describe two forms of apparatus embodying my invention, and shall then point out the novel features thereof in claims.

Figure 2:
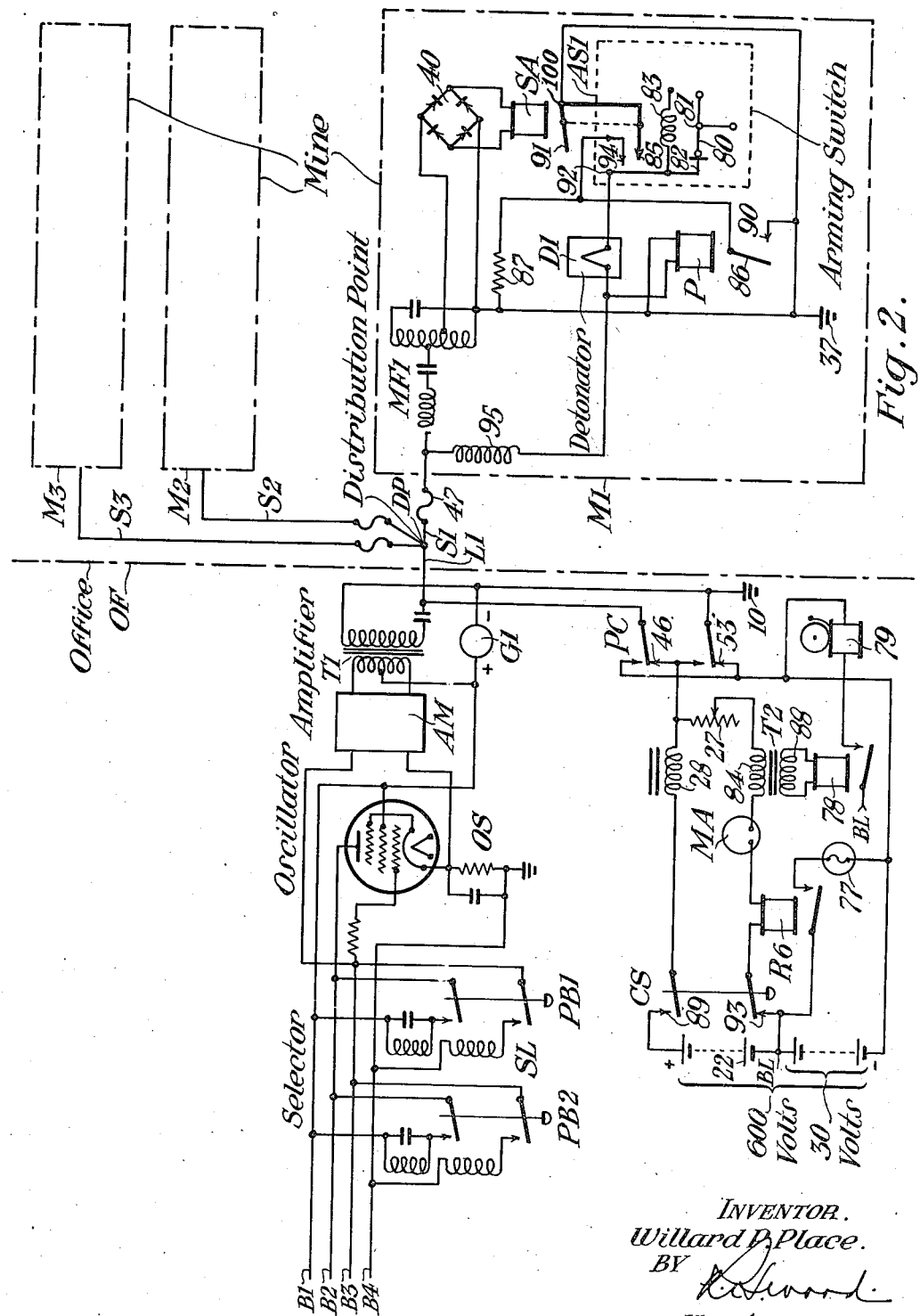

In the accompanying drawings, Fig. 1 is a diagrammatic view showing one form of apparatus embodying my invention for selective control, indication, test and operation of the mines of a mine field. Fig. 2 is a diagrammatic view showing another and more simplified form of apparatus embodying my invention for selective control, test, operation and indication of the mines of a mine field. In each of the two views, like reference characters are used to designate similar parts.

It is to be understood that I do not limit my invention to mine fields, and this one use merely serves to illustrate the many places where apparatus embodying my invention is useful. For example, apparatus here disclosed would be useful for governing the outlying track switches and signal appliances of a railway from a designated point or office.

Referring to Fig. 1, the reference character OF designates an office from which a number of mines, each designated by the reference character M plus a numeral can be controlled. Ordinarily a group of such mines, or a plurality of similar groups of mines would be provided to protect the area to be defended. In Fig. 1, only three mines M1, M2 and M3 of a mine field are shown, since these are sufficient to fully illustrate my invention. Office OF may be on shore in the vicinity of a harbor that is to be defended by the mines M1, M2 and M3, which would be suitably distributed about the harbor. The office OF and the mines M are connected by a transmitting circuit. As here shown, one side of the circuit comprises a single conductor cable L1 extending from the office to a junction or distribution point DP conveniently located with respect to the mine field, and a single conductor cable from the distribution point DP to each mine, the cables for the three mines M1, M2 and M3 being identified by the reference characters S1, S2 and S3, respectively. As will appear hereinafter, the other side of this transmitting circuit is completed through the ground path although a metallic conductor can be used if desired. Thus there is provided a two-conductor transmitting circuit extending from the office to the mines in multiple.

The apparatus at the office OF comprises sources of oscillating or alternating currents of different frequencies, two sources of direct current of different voltages, control and testing devices and indication means. The sources of currents of different frequencies consist of an electron tube oscillator OS and a manually operable selector SL, together with a power amplifier AM. Electron tube 4 of the oscillator OS is shown as of the indirectly heated type whose filament is constantly heated in the usual manner, and which tube is provided with a plate 5, a cathode 6 and a control grid 7. The selector SL comprises oscillating circuits and manually operable controllers in the form of push buttons, there being provided a push button and an associated oscillating circuit for each mine to be governed. For the sake of simplicity, push buttons PB1 and PB2 and their associated circuits for mines M1 and M2, respectively, are the only ones shown since these are sufficient for a full understanding of the invention. The push buttons control the frequency of the current generated by oscillator OS by controlling the connections of the different oscillating circuits to the tube. For convenience the positive terminal of a generator G1, which supplies plate voltage for tube 4 is connected to a bus wire B1, plate 5 of tube 4 is connected to a bus wire B2, control grid 7 is connected to a bus wire B3 through a resistor 8, and the negative terminal of generator G1 is connected to a bus wire B4 through ground electrodes 9 and 10. The different oscillating circuits are connected across these bus wires over contacts of the different push buttons. For example, push button PB1 when operated to close its contacts 11 and 12, connects an oscillating circuit consisting of an inductor 13 and a condenser 14 in multiple, across bus wires B1 and B2, and a winding 15 inductively coupled to inductor 13 across the bus wires B3 and B4. Consequently operation of push button PB1 conditions the oscillator OS to generate current of a frequency predetermined by the proportioning of inductor 13 and condenser 14. Similarly, operation of push button PB2 connects an oscillating circuit consisting of an inductor 25 and a condenser 26 in multiple to bus wires B1 and B2, and a winding 24 inductively coupled to inductor 25, to bus wires B3 and B4, and the oscillator is conditioned to generate current of a frequency predetermined by the proportioning of inductor 25 and condenser 26. The current generated by oscillator OS is supplied to power amplifier AM by wires 16 and 17. Amplifier AM is shown conventionally since it may be of any one of several well-known constructions and it is sufficient for this disclosure to point out that current from oscillator OS is amplified and supplied to a transformer T1 having a winding 18 connected to the output terminals of amplifier AM and another winding 19 connected to the transmitting circuit, winding 19 having one of its terminals connected to conductor L1 through a condenser 20 and its other terminal connected to ground electrode 10 by wire 21. It is to be seen therefore that current of any one of several different preselected frequencies is supplied to the transmitting circuit by selective operation of the different push buttons. The use of currents of different frequencies generated by oscillator OS will appear hereinafter.

The office sources of direct current of different voltages consist of different portions of a battery 22. The full battery 22 delivers a relatively high predetermined voltage here indicated as 600 volts, and a portion of battery 22 delivers a predetermined low voltage here indicated as 30 volts, the positive and negative terminals of battery 22 being indicated by the plus and minus signs and the 30 volt mid terminal being indicated at BL. Battery 22 is connected to the transmitting circuit through control and testing devices comprising a manually operable pole changer PC, a reset switch 23 and a two position testing and firing switch or controller CS. An indicating device in the form of a milliammeter MA, together with a resistor 27 and an inductor 28 are interposed in the connections of battery 22 to the transmitting circuit. The manner whereby battery 22 is connected to the transmitting circuit to supply current either at 600 volts or at 30 volts or current of one polarity or the other for governing the mine field will be explained when the operation of the apparatus is described.

The office indication means includes a visual indicator for each mine, the different indicators being connected to the transmitting circuit through different selective circuits, each of which selective circuits includes a filter and an amplifier. For the sake of simplicity, only indicators K1 and K2 for mines M1 and M2 are shown in Fig. 1, because these indicators are all alike except as to the tuning of the respective filters and a description of one will suffice for an understanding of all. Considering indicator K1, for example, a gas filled grid controlled type of electron tube 31 has its control grid 32 and cathode 33 connected to the transmitting circuit through a filter DF1 whose input terminals are connected to the line conductor L1 and ground electrode 10 by wires 29 and 21, and whose output terminals are connected to grid 32 and cathode 33 through resistors 30 and 34, respectively. The filament and plate circuits of tube 31 are supplied with current from the 30 volt portion of battery 22, as will be readily understood from an inspection of the drawings. A gas discharge tube, such as a "neon" lamp 35 and a condenser 36 are interposed in the plate circuit of tube 31 to illuminate lamp 35 by the capacity discharge of a condenser 36 when tube 31 breaks down. Filter DF1 is proportioned to pass a preselected frequency only and which frequency corresponds to that of an indication current supplied to the transmitting circuit at mine M1 in a manner to be later described. Hence when such indication current is supplied to the transmitting circuit, the tube 31 breaks down and lamp 35 is made to flicker or appear to glow steadily, whichever is desired. The indicator K2 is of like construction except that its filter DF2 is formed to pass current of a different frequency and to pass current of the frequency of an indication current supplied to the transmitting circuit at the mine M2 in a manner to later appear. As stated above, a similar indicator not shown, would be provided for mine M3 and each of the other mines in the field.

Each mine is provided with an electrical equipment through which the mine is controlled, operated or fired, tested and indicated. This electrical equipment comprises as essential elements a selective means, a control means, an operating element and an indication current generator. The mine equipments are all alike except as to the tuning of the respective selective means and indication current generator, and a description of the equipment for one mine is sufficient for an understanding of all. In Fig. 1, the equipment for mine M1 is shown complete, but the equipments for mines M2 and M3 are shown conventionally only since they would be but duplications of that for mine M1.

The selective means for mine M1 includes a filter MF1 and a two winding relay S. The filter MF1 is of the two section type having its input side connected across cable S1 and ground electrode 37, while a portion of inductor 39 of the filter is connected to a winding 38 of relay S through a full wave rectifier 40. Filter MF1 is proportioned to pass current of the frequency supplied by the office oscillator OS when conditioned for operation by push button PB1, the push button PB1 being the one associated with mine M1. It follows that when push button PB1 is operated to cause an alternating current of a preselected frequency to be supplied to the transmitting circuit such current is passed by filter MF1 and rectified at rectifier 40 to energize winding 38 of relay S. That is to say, winding 38 of relay S is energized and relay S is picked up in response to operation of push button PB1. Subsequent to such selection of relay S, it is retained picked up by energization of its second winding 50 by direct current supplied to the transmitting circuit in a manner to be shortly pointed out.

The control means for the equipment for mine M1 includes a polar relay P, two neutral relays V and R1, and an arming switch AS. Polar relay P is a direct current polar relay characterized by the fact that when the relay is deenergized, its armature remains in the position to which it was last moved. Relay V is characterized by the fact that it is energized sufficiently to be picked up only when supplied with the high voltage originating at the office, here assumed to be 600 volts. Arming switch AS may be any one of several well-known types and it is sufficient for this disclosure to point out that the switch AS is mounted on the mine M1 to assume a normal position, that is, the position shown in Fig. 1, and at which position its contacts 41 and 42 are both open. When a ship contacts the mine the switch AS is tilted in one direction or the other from the normal position to close either contact 41 or 42.

The operating element of the equipment for mine M1 comprises a detonator D1 which when supplied with current in excess of a predetermined voltage, fires the mine. For the purpose of illustration I shall assume that detonator D1 fires the mine when supplied with current of 600 volts, but that current of 30 volts is insufficient to cause firing, but is sufficient to test the condition of the detonator.

The indication current generator is indicated as a whole by the reference character MO1 and comprises a low voltage oscillating tube 43 and a low voltage amplifying tube 44. As will appear hereinafter, generator MO1 functions as a converter to generate an indication alternating current of a preselected frequency when energized by direct current of 30 volts. Furthermore, the frequency of the indication current generated corresponds to that passed by the filter DF1 of the office indicator K1, indicator K1 being associated with mine M1.

In describing the operation of the apparatus of Fig. 1, I shall assume that push button PB1 has been pressed to select mine M1, relay S being energized by alternating current supplied by oscillator OS and passed by filter MF1 as explained hereinbefore. Relay S once selected is retained energized subsequent to such selection by energization of its winding 50 by direct current from battery 22, the circuit passing from terminal BL of battery 22, through ammeter MA, contact 45 of controller CS, resistor 27, inductor 28, contact 46 of pole changer PC, conductor L1 of the transmitting circuit to distribution point DP, thence through a fuse 47, single conductor cable S1, back contact 48 of relay V, front contact 49 of relay S, winding 50 of relay S, normal polar contact 51 of polar relay P, wire 52, ground electrode 37 and ground path to ground electrode 19 at the office, contact 53 of pole changer PC, and reset switch 23 to the lower negative terminal of battery 22. It follows, therefore, that subsequent to a momentary selection of relay S by alternating current supplied over the transmitting circuit, the relay S is held energized by direct current supplied by battery 22 over the transmitting circuit. It is to be noted that the winding of relay V is connected across conductor S1 and ground electrode 37, but that relay V is not energized sufficiently by current of 30 volts so as to be picked up. Polar relay P is also connected across single conductor cable S1 and ground electrode 37 through a circuit path including back contact 48 of relay V, front contact 49 of relay S, winding of relay P and wire 52. Relay P is now energized at a polarity to retain its normal polar contact 51 closed.

With relay S picked up to close its front contact 55, the generator or oscillator MO1 is energized by the direct current supplied by battery 22 to the transmitting circuit. The filaments 56 and 57 of tubes 43 and 44 are connected in series in a circuit path between cable S1 and ground electrode 37, and which circuit path includes back contact 48 of relay V, front contact 55 of relay S, resistor 58, filaments 57 and 56, resistor 59 and inductor 60. The direct current is also impressed on plate 61 of tube 43 through an oscillating circuit comprising inductor 62 and condenser 63 in multiple, and on plate 64 of amplifier tube 44 through an inductance 65, as will be apparent by an inspection of Fig. 1. A winding 66 is inductively coupled to the oscillating circuit 62—63 and is connected to control grid 67 of tube 43 through a resistance 70 and to grid 68 of tube 44 through a resistor 71. The parts are so proportioned that a current of a preselected frequency is generated by tube 43, amplified by tube 44, and supplied to the transmitting circuit over the circuit path including front contact 55 of relay S. This indication current is of the frequency passed by filter DF1 and lamp 35 of indicator K1 is caused to glow to inform the office operator of the selected and alert condition of the equipment of mine M1.

Selection and control of the mines M2 and M3 are effected in a manner similar to that just described in connection with mine M1, the condition of mine M2 being indicated at indicator K2 at the office and the condition of mine M3 being in like manner indicated at the office by a corresponding indicator.

The selection of mine M1 and of all other mines can be cancelled by operation of reset switch 23 to open the circuit path by which battery 22 is connected to the transmitting circuit and cause the relay S to be deenergized and released, the reset switch 23 being held open for a period sufficient to insure the release of relay S, which is preferably designed with slow release characteristics.

After selection of mine M1, the operator can condition the equipment for the mine to be fired upon the mine being armed by a ship contacting the mine to actuate switch AS. To do this, the operator sets controller CS at its "ready" position to close contact 73 and apply the full 600 volts of battery 22 to the transmitting circuit. This 600 volts energizes relay V sufficiently that is picks up to open back contact 48 and a resistor 74 is interposed in the circuit paths of winding 56 of relay S, polar relay P and generator MO1 so that relays S and P and generator MO1 are not over-energized by the current of 600 volts. With arming switch AS tilted to close either contact 41 or 42, a circuit path is completed from cable S1 through front contact 54 of relay S, a resistor 72, detonator D1, contact 41 or 42 as the case may be, and wire 52 to ground electrode 37, and with current of 600 volts supplied to the transmitting circuit, the current flowing through detonator D1 is of sufficient value to cause the mine to be fired.

The operator after selecting mine M1 and placing the controller CS at its "ready" position can fire the mine independently of the arming switch AS by means of polar relay P. Reversal of pole changer PC reverses the current supplied from battery 22 to the transmitting circuit with the result that polar relay P is operated to its reverse position to close polar contact 74 and complete the circuit path for detonator D1 around the contacts 41 and 42 of the arming switch. Relay S will release when its energization falls to zero due to the reversal of the polarity of the current from battery 22 but that relay S has a slow release period sufficient that relay P is reversed and the mine fired before relay S is released. Hence the operator can select and immediately fire any one of the mines or can select and then fire all of the mines of the group simultaneously.

The equipment for mine M1 is tested by the operator selecting the mine and setting controller CS at its "test" position to close contact 45 and apply direct current of 30 volts to the transmitting circuit. At mine M1, the several circuit paths between cable S1 and ground would consume a predetermined value of current, which value will be indicated by the ammeter MA. A value of current less or more than the predetermined value would designate a fault of the equipment. Illumination of lamp 35 of indicator K1 is of course an indication of the alert condition of the equipment of mine M1. To test the detonator D1 the operator would first reverse pole changer PC with 30 volts applied to the transmitting circuit before the mine is selected. He would then operate push button PB1 to send an alternating current for energizing relay S relay S being picked up by current of proper frequency. Polar relay P would then be operated to close its reverse contact 74 and complete the circuit path through detonator D1, with the result that the reading of ammeter MA would be increased a predetermined value. Hence all the essential elements of the equipment for mine M1 can be tested from the office, with the exception of the arming switch AS.

Assuming that mine M1 has not been selected and a ship contacts the mine to actuate the arming switch AS, the indicator K1 is made to glow to indicate to the operator the presence of such a ship, it being assumed that the transmitting circuit is normally excited by 30 volts from battery 22. With either contact 41 or 42 closed, then relay R1 is energized by current flowing in a circuit path extending from cable S1 through back contact 48 of relay V, winding of relay R1, contact 41 or 42 of switch AS and wire 52 to ground electrode 37. With relay R1 energized and picked up it provides a stick circuit at its front contact 75. The circuit path to generator MO1 is now completed at front contact 76 of relay R1 and generator MO1 is made active to generate the indication current which is now supplied to the transmitting circuit through front contact 76 of relay R1, and indication means K1 at the office is actuated. Following such an indication of the presence of a ship, the operator can fire the mine M1 by operating push button PB1 to bring about the energizing of relay S, setting controller CS at its "ready" position and reversing pole changer PC so that 600 volts is applied to the detonator D1 through the circuit path including polar contact 74 of relay P.

In the event mine M1 is fired, the cable S1 will be torn loose at the mine and such free end will become grounded and the resultant flow of direct current will be of such value that fuse 47 blows and disconnects cable S1 from the system so that the remaining mines can be operated from the office the same as before.

In Fig. 2, an office OF is connected to the mines of a mine field by a two-conductor transmitting circuit, as in Fig. 1. Also, the office is provided with an oscillator OS which is conditioned by selector SL to supply currents of different frequencies to the transmitting circuit as in Fig. 1. The office indicators K have been omitted in Fig. 2, but additional indicating devices are associated with the source of direct current 22. Such additional indicating devices include a relay R6 to control an indication lamp 77, and a "kick" transformer T2 to control a bell 79 through a relay 78. The winding of relay R6 and winding 84 of transformer T2 are connected in series with ammeter MA.

The equipments at mines M1, M2 and M3 of Fig. 2 would preferably be alike, and the equipment at mine M1 is shown complete, while those for mines M2 and M3 are shown conventionally only since they are duplications of that for mine M1. The equipment for mine M1 includes a filter MF1 through which alternating current of a preselected frequency is passed and rectified at rectifier 40 to energize a selection relay SA, relay SA being a single winding relay to whose armature 91 a contact 85 associated with an arming switch AS1 is attached. The arming switch AS1 of Fig. 2 is preferably provided with an actuating member 80 pivoted at 81 to be tilted in either direction when the mine is contacted by a ship. A contact member 82 suspended at 92 is held at its left-hand position, that is, at the position shown in Fig. 2, by actuating member 80 at its normal position. Contact member 82 is biased by spring 83 to a right-hand position when actuating member 80 is tilted to disengage contact member 82. Contact member 82 at its right-hand position engages a stationary contact 94. Also a contact member 85 is pivoted at 100 along with armature 91 of relay SA and is operatively connected to armature 91 as indicated by a dotted line so that the picking up and releasing of armature 91 rotates the contact member 85 about pivot 100. Contact member 85 is disposed so that energization of relay SA to pick up its armature 91 actuates contact 85 to engage contact member 82 at either its left-hand or its right-hand position. Furthermore, energization of relay SA to actuate contact 85 will force contact member 82 to the left from its right-hand position against the force of biasing spring 83 and thereby provides a means whereby the arming switch AS1 can be reset and the mine disarmed subsequent to the switch being actuated to arm the mine. It is to be understood, of course, that such resetting of the arming switch AS1 would take place only in the event the mine is not fired.

The apparatus of Fig. 2 is shown in the normal condition, and in which condition the transmitting circuit is excited by the 30 volt source of direct current as will be apparent by an inspection of the drawings.

At mine M1 direct current normally flows through the cable S1, impedance 95 and winding of polar relay P to ground electrode 37, and relay P is energized as required to operate its polar contact member 86 to the left-hand position. The normal load on battery 22 is thus only that required to energize the polar relay P of each mine, and with a mine field consisting of a predetermined number of mines, the reading of ammeter MA would indicate a predetermined value. Relay R6 connected in series with ammeter MA is adjusted so that it is not normally energized sufficiently to be picked up.

If mine M1 is struck by a ship, arming switch AS1 is actuated, and the event is indicated at the office. Actuation of arming switch AS1 closes contact 82—94, completing a circuit path from cable S1 through impedance 95, detonator D1, contact 82—94, and resistance 87 to ground electrode 37. The additional flow of current through this circuit path through detonator D1 is not only indicated at ammeter MA but also causes relay R6 to be picked up and lamp 77 to be illuminated. Also the sudden increase of the flow of direct current through winding 84 of transformer T2 when contact 82—94 is closed induces an electromotive force in winding 88 of that transformer to energize relay 78 and cause bell 79 to be momentarily sounded. The operator upon receiving such an indication can fire the mine by reversing pole changer PC to reverse polar relay P and then shifting the controller CS to close contact 89 and connect the full battery 22 to the transmitting circuit. Current now flows in a circuit path extending from cable S1 through impedance 95, detonator D1, contact 82—94 of the arming switch, and polar contact 90 of relay P to the ground electrode 37. The direct current applied to the transmitting circuit being of 600 volts, the current flowing in detonator D1 is sufficient to at once fire the mine.

Mine M1 can be fired when not armed by switch AS1 by the operator pressing push button PB1 to send alternating current to energize relay SA and then setting the controller CS to close contact 89 and connect the full battery 22 to the transmitting circuit. The circuit path to detonator D1 is now completed through contact 82—85, and the mine is fired by the 600 volts. Mine M1 of Fig. 2 can be conditioned to be fired at once if armed by a ship. To do this, the operator would set controller CS to close contact 89 to apply 600 volts to the transmitting circuit and also reverse pole changer PC causing polar relay P to be reversed. With relay P reversed and 600 volts present on the transmitting circuit and arming switch AS1 tilted by a ship, contact 82—94 is closed to complete the circuit path through detonator D1 and the mine is fired. In this connection it is to be pointed out that in Fig. 2 polar relay P is so proportioned that it is not overenergized by direct current of 600 volts. If mine M1 of Fig. 2 is fired, cable S1 is grounded and fuse 47 blown to free the system of the fired mine the same as in Fig. 1.

To test the equipment of mine M1 of Fig. 2, the operator would set controller CS to apply 30 volts to the transmitting circuit and then press push button PB1 to send alternating current that selects relay SA so that contact 82—85 is closed to complete the circuit path through the detonator D1. If this circuit path through detonator D1 is complete, then additional current flows and the fact is indicated at ammeter MA.

The apparatus of Fig. 2 can be further simplified by omitting pole changer PC at the office and omitting polar relay P at the mine equipment. When so modified there would be normally no direct current flow through the equipment of the mine, and operation of arming switch AS1 to close contact 82—94 to complete the circuit path through the detonator would be indicated at the ammeter MA. With the apparatus thus modified, relay R6 would be preferably adjusted to be picked up by the flow of current through the detonator of any one mine to actuate the lamp 77, and the transformer T2 and relay 78 would be conditioned so that such increase of current would sound the bell 79. After such an indication, the operator would press the push buttons of the selector one after another to search out the armed mine. If the reading of ammeter MA increases while the selector push button is pressed and then is reduced to its normal value after the push button is released, that mine has not been armed. The armed mine would show some increase but less than the increase effected by an unarmed mine. This is true because at the armed mine the path through detonator D1 and resistor 87 is already completed and there is a certain amount of current flowing before contact 82—85 is closed by the selection of relay SA. When the located armed mine is found, the operator can fire the mine by applying 600 volts to the transmitting circuit.

With apparatus here disclosed, a group of nineteen mines can readily be controlled by currents ranging in frequencies from 25 to 670 cycles per second with a twenty per cent separation between each mine, such separation giving at least a ten to one discrimination with simple two-section filters. Such group of nineteen mines can be indicated by indication currents ranging in frequencies from say 1000 to 27,000 cycles per second with at least a twenty per cent discrimination between separate mines. Direct voltage of 600 volts for firing the mine and 30 volts for testing and controlling provides a wide margin of safety between these conditions. It is of course to be understood that my invention is not limited to these frequencies and voltages set forth above, but the examples given would be satisfactory.

Apparatus here disclosed has the advantage that the operator can select any one or any number of mines of a mine field so that contact with a ship causes a mine to be armed and the arming indicated. The operator can fire any armed mine. The selection of any mine or group of mines persists until the operator cancels the selection. The operator can arm any mine and fire it or arm any group and fire the group simultaneously. If the ship contacts a mine not previously selected, the fact is indicated at the office and the operator can fire the mine at once. The condition of the equipment of each mine can be readily tested by the operator at the office. Furthermore, a single two-conductor circuit is sufficient to provide the above services, and the ground can be used as one side of this circuit and requiring therefore but a single conductor cable from the control point.

Although I have herein shown and described only two forms of selective control and indication systems embodying my invention, it is understood that various changes and modifications may be made therein within the scope of the appended claims without departing from the spirit and scope of my invention.

Having thus described my invention, what I claim is:

1. In a selective system, the combination comprising, an office; a remotely disposed electrical equipment including a first relay, a polar relay and an operating element; said element being operated only when supplied with current of a predetermined high voltage, a two-conductor circuit between said office and equipment, an office supply means connected to said circuit to supply at times alternating current of a preselected frequency, another office supply means connected to said circuit to supply direct current either of said predetermined high operating voltage or of a predetermined low testing voltage according as a controller is set at a first or a second position, a pole changer interposed in the connection of said other supply means to said circuit, a first circuit means including a filter to connect said first relay to said circuit to energize said first relay only when current of said preselected frequency is supplied by said first mentioned supply means, a second circuit means to connect said polar relay to said circuit, a third circuit means including a contact of said first relay and a contact of said polar relay to connect said operating element to said circuit for testing and operating said element according to the positions of said controller and said pole changer, and a current indicating device interposed in the connection of said other supply means to said circuit.

2. In a selective system, the combination comprising, an office; a remotely disposed electrical equipment including a relay, an operating element and a controlling switch; said operating element being operated only when supplied with current of a preselected high voltage and said controlling switch being actuated to close a contact in response to a designated event, a two-conductor circuit between said office and said equipment, an office oscillator connected to said circuit to supply at times an alternating current of a preselected frequency, an office source of direct current connected to said circuit to supply current either of said preselected high voltage or of a preselected low voltage according as a controller is set at a first or a second position, an office indicating device interposed in the connection of said direct current source to said circuit, a first circuit path including a filter and a rectifier to connect said relay to said circuit to energize the relay by current supplied by said oscillator, a second circuit path including a front contact of said relay to connect the relay to said circuit to retain the relay energized by current supplied by said direct current source, and a third circuit path including a front contact of said relay and said controlling switch contact to connect said operating element to said circuit to indicate at said device the closing of said switch contact and to operate said element when said controller is set at its first position.

3. In a selective system, the combination comprising, an office; a remotely disposed electrical equipment including a relay and a converter, said converter generating an alternating indication current of a preselected frequency when supplied with direct current, a circuit between said office and said equipment, an office source of direct current connected to said circuit, office supply means connected to said circuit to supply at times an alternating control current of a preselected frequency, an office indication means connected to said circuit through a filter to actuate said indication means only by said indication current, a first circuit path including a filter to connect said relay to said circuit to energize the relay only by said control current, a second circuit path including a front contact of said relay to connect the relay to said circuit to retain the relay energized by current supplied by said direct current source, a third circuit path including a front contact of said relay to connect both the input and the output sides of said converter to said circuit to indicate the energized condition of said relay.

4. In a selective system, the combination comprising, an office; a remotely disposed electrical equipment including a relay, an operating element, a controlling switch and an electron tube oscillator; said operating element being operated only when supplied with current of a preselected high voltage and said controlling switch being actuated to close a contact in response to a designated event, said oscillator to generate alternating indication current of a preselected frequency when energized by direct current of a preselected low voltage, a circuit between said office and said equipment, an office source of direct current connected to said circuit to supply current either of said preselected high voltage or of said preselected low voltage according as a controller is set at a first or a second position, an office indicator means including a filter to connect said indicator to said circuit to energize the indicator only by said indication current, a first circuit path including said controlling switch contact to connect said relay to said circuit to energize the relay when said designated event occurs, a second circuit path including a front contact of said relay to connect both the input and the output of said oscillator to said circuit for controlling said indicator to indicate the occurrence of said event, and a third circuit path including said controlling switch contact to connect said operating element to said circuit for operating the element by setting said controller at its first position.

5. In a selective system, the combination comprising, an office; a remotely disposed electrical equipment including a relay, an operating element and a controlling switch, said operating element being operated only when supplied with current of a predetermined high voltage and said controlling switch being actuated to close a contact in response to a designated event, a circuit between said office and said equipment, an office generator connected to said circuit to supply at times an alternating current of a preselected frequency, an office source of direct current connected to said circuit to supply current either at said predetermined high voltage or at a predetermined low testing voltage according as a controller is set at a first or a second position, an indicating device interposed in the connection of said direct current source to said circuit, a first circuit path including a filter to connect said relay to said circuit to energize the relay only by current supplied by said generator, a second circuit path including said controlling switch contact to connect said operating element to said circuit to permit said element to be tested and to indicate at said device the occurrence of said designated event when said controller is set at either its first or second position, and a third circuit path including a contact operated when the relay is energized to connect the operating element to said circuit to operate the element when said controller is set at its first position.

6. In a selective system, the combination comprising, an office; a remotely disposed electrical equipment including a first relay, a polar relay, an operating element and a controlling switch; said operating element being operated only when supplied with current of a predetermined high voltage and said controlling switch being actuated to close a contact in response to a designated event, a two-conductor circuit between said office and said equipment, an office generating means connected to said circuit to supply at times alternating current of a preselected frequency, an office source of direct current connected to said circuit to supply current either at said predetermined high voltage or at a predetermined low voltage according as a controller is set at a first or a second position, a pole changer and an indicating device interposed in the connection of said direct current source to the circuit, a first circuit path including a filter to connect said first relay to said circuit to energize that relay only by current supplied by said generating means, a second circuit path to connect said polar relay to said circuit, a third circuit path including said controlling switch contact and a resistor connected to said circuit to indicate at said indicating device the occurrence of said designated event when the controller is set at its second position, a fourth circuit path including said controlling switch contact and a contact of said polar relay to connect the operating element to said circuit to operate the element when the controller is set at its first position, and a fifth circuit path including a contact closed when said first relay is energized to connect said operating element to the circuit to operate the element independent of said controlling switch contact.

7. In a selective system, the combination comprising, an office, a remotely disposed mine provided with electrical equipment including selecting means, a relay, a detonator, an arming switch and an electron tube oscillator; said selecting means including a filter and an electromagnetic device to energize the device in response to current of a preselected selecting frequency, said detonator to fire the mine when supplied with current of a preselected high voltage, said arming switch actuated to close a contact when a ship contacts the mine, said oscillator to generate alternating indication current of a preselected frequency when energized by direct current of a preselected low voltage, a circuit between said office and said mine, an office oscillator and manually operable switch to at times supply to said circuit current of said selecting frequency, an office source of direct current connected to said circuit to supply current either of said preselected high voltage of or said preselected low voltage according as a controller is set at a first or a second position, an office indicator, means including a filter to connect said indicator to said circuit to energize the indicator only by current of said preselected indication frequency, said selecting means connected to said circuit to energize said electromagnetic device from said office oscillator, a first circuit path including said arming switch contact to connect said relay to said circuit to energize the relay when a ship contacts the mine, a second circuit path including a front contact of said relay to connect said equipment oscillator to said circuit to energize the oscillator and to supply said indication current to said circuit to actuate said office indicator, and a third circuit path including a contact of said device and said arming switch contact to connect said detonator to said circuit to fire the mine when said controller is set at its first position.

8. In a selective system, the combination comprising, an office, a plurality of remotely disposed electrical equipments each of which includes a relay to govern active and inactive conditions of the equipment according as the relay is energized or deenergized, a two-conductor circuit between the office and said equipments, an office supply means including a selector and connected to said circuit to supply current of a different preselected frequency for each of said equipments in response to different predetermined positions of said selector, an office source of direct current connected to said circuit, a first circuit means including a filter for each of said equipments to connect the respective relay to said circuit to energize that relay only in response to the corresponding predetermined position of said selector, and a second circuit means for each said equipments including a front contact of the respective relay to connect that relay to said circuit to energize that relay by current supplied by said direct current source to retain in an active condition as many of such equipments as initially selected by said selector.

9. In a selective system, the combination comprising, an office, a plurality of remotely disposed electrical equipments each of which includes a two-winding relay to govern active and inactive conditions of the equipment according as said relay is energized or deenergized, a two-conductor circuit between said office and said equipments, an office supply means including a selector and connected to said circuit to supply current of a different preselected frequency for each of said equipments according to different predetermined positions of said selector, an office source of direct current connected to said circuit, means including a filter and a rectifier for each of said equipments to connect one of the windings of the respective relay to said circuit to energize the relay only in response to the respective position of said selector, and means at each of said equipments and including a front contact of the respective relay to connect the other winding of that relay to said circuit to energize the relay by current from said direct current source to retain in an active condition as many of said equipments as initially selected by said selector.

10. In a selective system, the combination comprising, an office, a plurality of remotely disposed electrical equipments each of which includes a two-winding relay and an operating element, said operating element being operated when supplied with current of a predetermined high voltage, a two-conductor circuit between said office and said equipments, an office supply means including a manually operable selector and connected to said circuit to supply current of a different preselected frequency for each of said equipments according to different predetermined positions of said selector, an office source of direct current connected to said circuit to supply current either of said predetermined high voltage or of a predetermined low testing voltage according to a first or a second position of a controller, a first circuit means including a filter and a rectifier for each of said equipments to connect one winding of the respective relay to said circuit to energize that relay only when current of the frequency preselected for the respective equipment is supplied by said supply means, a second circuit means at each of said equipments including a front contact of the respective relay to connect the other winding of the relay to said circuit to energize the relay by current supplied by said direct current source, and a third circuit means at each said equipments including a front contact of the respective relay to connect the respective operating element to said circuit for testing and operating of that element according to the position of said controller.

11. In a selective system, the combination comprising, an office, a plurality of remotely disposed electrical equipments each of which includes a relay to govern the active and inactive conditions of the equipment according as the relay is energized or deenergized, a two-conductor circuit between said office and said equipments, office supply means including a selector and connected to said circuit to supply current of a different preselected frequency for each of said equipments in response to different predetermined positions of said selector, an office source of direct current connected to said circuit, a first circuit means at each of said equipments including a filter to connect the respective relay to said circuit to energize that relay only in response to the respective position of said selector, a second circuit means at each of said equipments including a front contact of the respective relay to connect that relay to said circuit to retain the relay energized by current supplied by said direct current source, an electron tube oscillator at each of said equipments to generate when energized an indication current of a frequency different for each of said equipments, office indicators one for each of said equipments and each such indicator connected to said circuit through a filter to energize that indicator only by indication current supplied by the oscillator of the corresponding equipment, and circuit means at each said equipments including a front contact of the respective relay to connect the respective oscillator to said circuit to energize that oscillator by current supplied by said direct current source and to supply the current generated by that oscillator to said circuit.

12. In a selective system, the combination comprising, an office, a plurality of remotely disposed electrical equipments each of which includes a relay, an operating element and a controlling switch; each said operating element being operated when supplied with current of a predetermined high voltage and each said controlling switch being actuated to close a contact in response to a designated event at the respective equipment, a two-conductor circuit between the office and said equipments, an office generating means connected to said circuit to supply current of a different preselected frequency for each of the equipments, an office selector provided with a different position for each equipment and connected to said generating means to condition the generating means at each of said positions to supply current of the frequency preselected for the associated equipment, an office direct current source connected to said circuit to supply current either at said high voltage or at a predetermined low voltage according to a first or a second position of a controller, a first circuit means including a filter at each of said equipments to connect the respective relay to said circuit to energize that relay only when current of the frequency preselected for that equipment is supplied by said generating means, a second circuit means at each of said equipments including a front contact of the respective relay to connect that relay to said circuit to retain that relay energized by current supplied by said direct current source, and a third circuit means at each of said equipments controlled by the respective relay and controlling switch contact to connect the respective operating element to said circuit to check the condition of that element by direct current of said low voltage and to operate that element by direct current of said high voltage.

13. In a selective system, the combination comprising, an office, a group of remotely disposed mines, a circuit including ground and a conductor extending from the office to said mines in multiple; an equipment for each of said mines including a relay, a detonator and an arming switch; said arming switch to close a contact when a ship disturbs the respective mine, circuit means at each of said mines to connect the respective relay to said circuit and including a filter to energize the relay only in response to current of a frequency preselected for each mine, an office supply means including a multiple position selector to supply current of different frequencies and connected to said circuit to selectively energize said relays, a source of direct current at the office connected to said circuit, a stick circuit for each of said relays to connect the relay to said line circuit to retain a selected relay energized by current supplied from said office direct current source, and another circuit means at each mine controlled jointly by the respective relay and arming switch to connect the respective detonator to said circuit to automatically fire any previously selected mine of the group by current supplied by said direct current source in response to a ship disturbing that mine to close the respective arming switch contact.

14. In a selective system, the combination comprising, an office and a remote mine connected by a transmitting circuit, said mine provided with a relay, a detonator and an arming switch, said relay connected to said circuit and energized only by current of a preselected characteristic, said detonator to fire the mine only when supplied with current of a preselected high voltage, said arming switch normally positioned to disconnect said detonator from said circuit to disarm the mine and actuated to another position to connect said detonator to said circuit to arm the mine when a ship contacts the mine, an office source of current of said preselected high voltage connected to said circuit through a manually operable controller for firing said detonator but said controller normally set to disconnect the source, an office source of current of said preselected characteristic connected to said circuit through another manually operable controller to energize said relay, and means operated by said relay when energized to actuate said arming switch to its normal position for disarming the mine.

15. In a selective system, the combination comprising, an office; a remotely disposed mine having a first relay, a polar relay, a detonator and an arming switch; said detonator to fire the mine only when supplied with current of a preselected high voltage, said arming switch actuated to close a contact when a ship contacts said mine, a line circuit between said office and mine, an office supply means including a generator connected at times to said circuit to supply alternating current of a preselected frequency, an office source of direct current connected to said circuit to supply current either of said high voltage or of a preselected low testing voltage according to a first or a second position of a controller, a pole changer interposed in said connection of said direct current source, a first circuit path including a filter to connect said first relay to said line circuit to energize that relay only by current from said generator, a second circuit path including a front contact of said first relay to connect said polar relay to said line circuit to energize the polar relay at normal or reverse polarity by current from said direct current source according to the position of said pole changer, and a third circuit path including a front contact of said first relay and either the contact of said arming switch or a reverse contact of said polar relay to connect said detonator to said line circuit to either automatically fire the mine when a ship contacts the mine or to manually fire or test the mine as predetermined by the positions of said controller and pole changer.

16. In a selective system, the combination comprising, an office, a group of remotely disposed mines, a transmitting circuit extending from the office to said mines in multiple; each of said mines provided with a first relay, a polar relay, an arming switch and a detonator; said arming switch operable to close a contact when the respective mine is disturbed by a ship, said detonator operable to fire the respective mine only when supplied with current of a preselected high voltage, means including a filter at each of said mines to connect the first relays to said transmitting circuit with each such filter tuned to pass current only of a preselected frequency with a different frequency for each mine, office supply means connected to said transmitting circuit to supply currents of different frequencies according to different positions of a selector to selectively energize the first relays of the mines, an office direct current source connected to said transmitting circuit to supply current at said preselected high voltage or at a preselected low voltage according to a first and a second position of a controller, a pole changer interposed in said connections of said direct current source, a stick circuit for each of said first relays to connect the respective relay to said transmitting circuit to retain a selected relay energized by said direct current source, each of said polar relays connected to said transmitting circuit through a front contact of the first relay of the same mine to energize the polar relay according to the position of said pole changer, a first circuit path at each mine to connect the detonator to the transmitting circuit and including a front contact of the first relay and the contact of the arming switch of the same mine to automatically fire any previously selected mine when a ship disturbs such mine, and a second circuit path at each of said mines to connect the detonator to said transmitting circuit and including a front contact of the first relay and a contact of the polar relay of the same mine to manually fire simultaneously all previously selected mines or to test such mines according to the position of said controller and pole changer.

WILLARD P. PLACE.